Oct. 29, 1946.  E. F. MAHLBERG  2,410,297
COUPLING COMBINATION
Filed Aug. 17, 1943
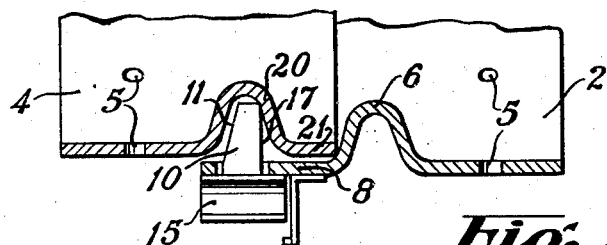
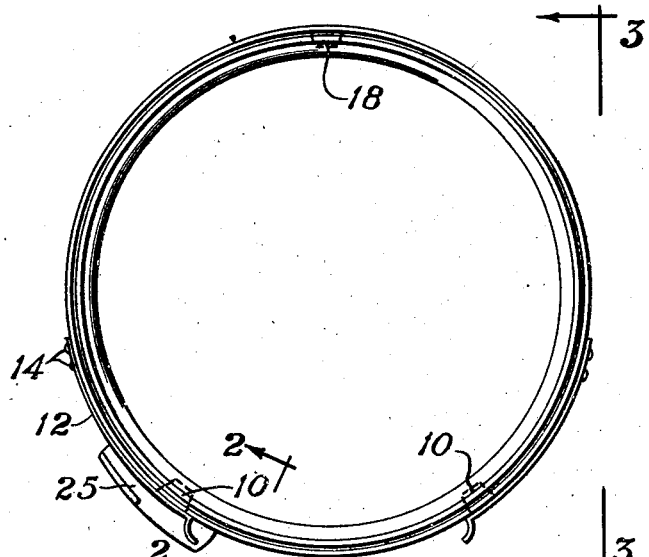
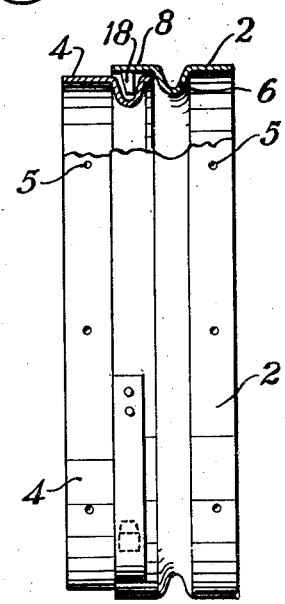
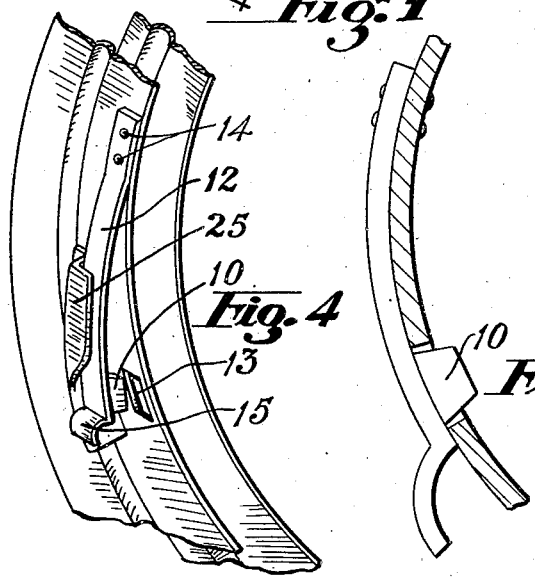
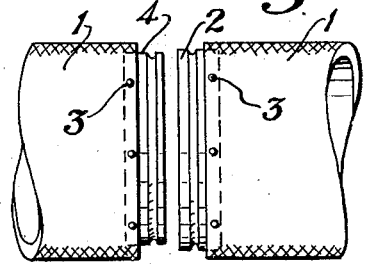
INVENTOR.
*Elroy F. Mahlberg*
BY *Walter C. Wheeler*
ATTORNEY Patented Oct. 29, 1946

2,410,297

UNITED STATES PATENT OFFICE 2,410,297

COUPLING COMBINATION

Elroy F. Mahlberg, Fairfield, Conn., assignor to E. I. du Pont de Nemours & Company, Wilmington, Del., a corporation of Delaware Application August 17, 1943, Serial No. 498,918

5 Claims. (Cl. 285—174)

This invention relates to conduits suitable for conducting gases which comprise tubular lengths of piping having side walls comprising collapsible material and self-sustaining coupling devices for coupling the tubular lengths together to form a conduit.

Heretofore collapsible conduits, such as tubes composed of tightly woven collapsible fabric or rubber coated fabric have been used to conduct gases for ventilation, aeration and similar purposes. The collapsible material was sometimes maintained in a tubular form by non-collapsible rings secured at intervals inside of the tubing. In locations such as mines and the holds of ships such tubular members are especially useful since they can be bent around odd angles and installed, either temporarily or permanently without the use of special angular fittings. The use of collapsible conduits in ships is desirable since the collapsible conduits can be stored in a small space when not in use. In such installations, the lengths of collapsible tubing have been joined together by rigidly attaching the contiguous ends of the tubing to rings or collars. Because of the permanent nature of the rigid attachment, this arrangement presented the difficulty that the assembled conduit could not be readily and conveniently disjoined or adjusted to correct twisting in the conduit resulting from faulty installation or for relocation of the conduit, or in order to make changes in the length of the conduit or for other purposes.

It is among the objects of the present invention to provide a self-sustaining coupling device for such tubing which may serve both as a permanent coupling and as a temporary coupling. Another object of the invention is to provide such a coupling or joining device which can be readily disjoined. A further object of the invention is to provide such a coupling device which can be circumferentially manipulated and adjusted without disassembling. Another object of the invention is to provide a conduit having tubular lengths comprising collapsible side walls and such self-sustaining coupling members capable of being readily disassembled. Still other objects of the invention will be apparent from the following description.

The objects of the invention are attained in general by providing a pair of nesting or telescoping collars constructed of material of a self-sustaining nature, such as metal or a synthetic plastic to which the contiguous ends of the tubing are attached. One of the nesting collars is provided with a circumferential channeled portion adapted to receive spaced latching and lug members mounted on the outer collar. The outer collar is also provided with a circumferential inwardly projecting abutment adapted to abut against the end of the inner nested collar.

The invention will be more particularly described with reference to the drawing in which Fig. 1 is an end view of the coupling device, Fig. 2 is a view partially in elevation and partially in cross section taken along the line 2—2 of Fig. 1 showing the assembled coupling members and the manner of assembling a latching member, Fig. 3 is a side elevational view of the coupled members, one part of which is broken away to show a lug member, Fig. 4 is a view in perspective of a portion of the rings showing the latching device in unlocked position, Fig. 5 is a side view of a portion of a conduit showing the nesting coupling members mounted on the contiguous ends of the collapsible tubular members, and Fig. 6 is a side view partially in cross section showing the latching member in locked position.

Referring to Fig. 5, the tubular members comprising the portions of the conduit, the side walls of which may comprise collapsible material and may or may not be reinforced or supported from within with rings, are joined together in series at their ends by the coupling members hereinafter to be more particularly described. Accordingly an outer collar 2 of the coupling is mounted at the end of a section of tubing 1 as by riveting the collar inside of the tube 1 by means of the rivets 3 which extend through the openings or holes 5 in the collar and side wall material. At the opposite end of the tube an inner collar 4 is similarly mounted on another section of tubing. The sections of tubular material thus prepared are then joined together end to end by securing together the inner and outer collar members. Thus a unit of a conduit when assembled comprises essentially a tubular section 1, outer collar 2, inner collar 4 and another tubular section 1, assembled in the order named. Commonly the gas conducting conduit consists of a plurality of such sections, and when so constituted the extreme ends of the tubular units may appropriately be provided with the described rings or the exit end section may be provided with only one ring.

In assembling the units which make up the conduit, the coupling members are constructed so that the ring members 2 and 4 can be united merely by bringing them into nested or telescopic engagement and then pressing them together. As shown in Fig. 3, the terminal flange 8 of the outer ring member 2 is made so as to have a sliding fit over the terminal portion 9 of the inner ring member 4.

The overlapping terminal portion 8 of the outer ring 2 is provided with a circumferential inwardly extending abutment or rib 6 which may be formed by providing the cylindrical portion of the ring with a rib as by rolling or molding. The circumferential abutment or rib 6 is a stop member against which the outer edge of the terminal portion 9 of the inner ring 4 abuts. These abutting members also serve as a sealing means to prevent undue leakage of gas but circumferential adjustment is permitted. The terminal flange 8 of the outer ring 2 is provided with a plurality of latching members as shown more in detail in Figs. 2, 4 and 6. Two latching members are shown but more than two can be provided. The latching members are attached to the outside of the telescoping portion 8 of the outer ring. They are mounted on a plane which is normal to the axis of the rings 2 and 4 and are spaced apart so that the latches will provide spaced locking and unlocking members. A desirable circumferential spacing of the latches may be about 20° to 70° depending upon the size of the rings so that the latches can be conveniently withdrawn with the fingers of both hands while holding the ring in joining position.

The latch 10 is a lug formed as shown in Fig. 2 with a leading face 11 inclined outwardly and backwardly toward the following face so that upon forced engagement with the terminal edge of the inner ring the latches will be forced outwardly and radially against leaf springs 12 upon which the latches are mounted. The following faces 17 of the latches 10 are in a less inclined or perpendicular plane to the cylindrical axis of the rings so that they will not cause the latches to be displaced when the conduit is under tension. As shown in Fig. 4, openings 13 are provided in the outer ring through which the latches freely extend. The leaf springs 12 normally holding the latches in depressed or locking position extend circumferentially a suitable distance around the outer surface of the ring and are secured thereto, as by rivets or bolts 14. At the ends of springs 12 near the latches are withdrawing members 15 for manually withdrawing the latches when unlocking or uncoupling of the rings is desired. In the form shown, the withdrawing members 15 consist of an arcuate bent portion at the end of the spring which is formed so that the spring can be flexed outwardly with the finger, but other convenient forms can be used.

Rigidly mounted on the outer ring is also a stop guard or guide member 25 which extends outwardly and overlaps the spring 12 near its free end. The stop member 25 is arranged to permit the spring and latch 10 to be withdrawn a distance sufficient to permit unlocking the rings but not sufficient to permit undue flexing of the spring 12. By limiting the outward movement of the spring 12, the stop member 25 provides a secure support when the spring is withdrawn to a limiting position and aids in positioning and guiding the rings into engagement without unduly flexing the leaf spring 12. The upstanding part of the stop 25 also serves as a guide against which the edge of spring 12 rests when the latch is withdrawn and it serves to guide the latch 10 into the opening 13 when the springs are released.

A permanent lug 18 is also mounted inside of the outer ring and in the same plane as the latches 12. The lug 18 may be located with any circumferential spacing from the latches to provide a secure three point attachment. With one lug attachment and two latches, the latches may desirably be assembled on either side of a position which is diametrical from the lug, but it is evident that with the latches 20° to 70° apart a considerable variation in the spacing is tolerable without impairing suitable locking.

As shown in Fig. 2, the inner or telescoping ring 4 has a circumferential channeled portion 20 near the inner end and a spacer portion 21 adapted to abut and come into sliding engagement with the bead 6 when the latches 10 and lug 18 are seated in the channel 20. In consequence thereof, the rings will be held together in close sliding engagement so that they can be turned to relieve undesired twisting or wrinkling in the collapsible tubular material attached to the rings. The inner ring, spacing portion 21 and channel 20 are proportioned so that the lug 18 can be placed in the channel 20 and the rings can be sprung together against the latches 10 by pressure parallel to the surfaces of the rings when assembly of the rings is desired. This admits of a slight circumferential play between the rings but the gas leakage resulting therefrom is diminished by the abutment of spacer 21 with the bead 6.

The channel 20 in the ring 4 is preferably provided with a bearing face parallel to the face 17 of the latch, but a curved bearing surface as shown in Fig. 2 is sufficient although such an inclined surface subjects the latch to considerable wear by reason of the limited contact near the end of the latch. Similarly the abutment or rib 6 is preferably provided with a face conforming to bearing surface at the outer edge of inner ring 4.

In assembling a conduit each section of tubular collapsible material has secured thereto an outer ring 2 at one end and an inner ring 4 at the other end. The units thus provided which may be made up with tubular portions of different lengths are than assembled by pressing together an outer and inner ring of different sections in the manner indicated. Removal of any tubular unit for repair or replacement may be attained by outwardly flexing the leaf springs 12, thereby withdrawing the latches 10 from the channels 20. This permits the disassembly of the rings.

The invention provides a conduit having the general utility of a flexible tubular conduit, such as a hose, but with the advantages that the walls are provided at intervals with means to prevent collapse of the tubular material, means to adjust for wrinkles or twisting in the collapsible portions and ready means to remove any unit for repair or adjustment of the length of the conduit at any point intermediate the ends.

From the foregoing disclosure it will be recognized that the invention is susceptible of modification without departing from the spirit and scope thereof and it is to be understood that the invention is not restricted to the specific illustrations thereof herein set forth.

I claim:

1. In a coupling device comprising a pair of tubular rings, one of said rings being an inner ring, a circumferential keeper channel in the inner ring and a tubular cylindrical spacing portion extending from the channel to the edge of said ring the wall of said inner ring being of uniform thickness throughout, an outer tubular ring formed with a cylindrical portion at one end for sliding over the inner ring, latches on the outer ring equally spaced from the outer edge thereof, said latches projecting inwardly from the inner surface of the ring and extending through openings in the ring, an inwardly extending circumferential rib on the outer ring spaced from said latches so as to provide a stop having sliding engagement with the outer end of the inner ring when the latches are seated in said channel and springs secured on said keeper latches and on the outer ring to retain the latches in seated position.

2. The device in accordance with claim 1 in which a guard is mounted on the outer ring disposed to engage the spring near its free end for limiting the movement of the spring when the latches are withdrawn.

3. The device in accordance with claim 1 in which the following faces of the latches which latchingly engage the inner surface of the keeper channel are normal to the axis of the tube and the keeper channel in the inner ring is formed to conform to the contiguous face of the latches when the rings are assembled.

4. The device in accordance with claim 1 in which the inwardly projecting rib of the outer ring is faced to conform to the end portion of the inner ring when the rings are in assembled position.

5. A device in accordance with claim 1 in which the circumferential keeper channel in the inner ring is formed with a face obliquely inclined to the axis of said cylindrical portion for continuously engaging the following faces of the latches as the engaging edge of the cylindrical spacing portion of the inner ring approaches engagement with the inwardly extending circumferential rib on the outer ring.

ELROY F. MAHLBERG.